3,560,541
METHOD OF PREPARING VINYL SILANES

Werner Graf, Ignaz Bauer, Siegfried Nitzsche, and Rudolf Riedle, Burghausen, Upper Bavaria, Germany, assignors to Wacker-Chemie G.m.b.H., Munich, Bavaria, Germany
No Drawing. Filed Jan. 14, 1969, Ser. No. 791,166
Claims priority, application Germany, Jan. 16, 1968,
P 16 68 855.4
U.S. Cl. 260—448.2         7 Claims

ABSTRACT OF THE DISCLOSURE

The reaction of vinyl halides with hydrogen silicon compounds is carried out in the presence of halogenated organic compounds which are gases at the reaction temperature (i.e. above 500°), whereby the formation of soot is reduced and the yield of product is increased. A typical reaction feed comprises methylhydrogendichlorosilane, vinylchloride and trichloroethylene or ethylbromide.

---

It is is known that silanes which contain silicon-bonded hydrogen atoms can be reacted with vinyl halides at temperatures above 500° C. while splitting off hydrogen halide to form vinyl silanes (see U.S. Patent No. 2,770,634, issued Nov. 13, 1956). Fortunately, the use of apparatus for this reaction is nominal. It suffices to lead the reaction components through a tube or other reaction vessel which has been heated to reaction temperature. In carrying out the above reaction according to previously known procedures on a large scale, however, it has been found that soot is formed in considerable quantities. This soot has the characteristic that it decreases the yield of vinyl silanes by catalyzing undesired side reactions, among them the formation of more soot. Furthermore, it blocks the apparatus relatively rapidly so that the production must be stopped and the reaction vessel must be cleaned before returning it to the production line.

In the method of the present discovery for preparing vinyl silanes by reacting silanes which contain silicon-bonded hydrogen atoms with vinyl halides at temperatures above 500° C., a very moderate formation of soot is to be observed so that the reaction can be carried forward for longer periods of time without interruption than has previously been possible and the expense for removing soot from the apparatus used for the reaction is considerably reduced. Furthermore, a higher yield of vinyl silanes is obtained than has been previously possible by using the method of the present invention.

The subject of the invention is a method of preparing vinyl silanes by reacting silanes which contain silicon-bonded hydrogen atoms with vinyl halides at temperatures above 500° C., in the presence of 0.05 to 10 percent by weight, calculated on the weight of vinyl halides, of compounds which are gaseous at the reaction temperature and which are different from the vinyl halides which are being used, being composed of carbon, halogen and hydrogen atoms or carbon and halogen atoms.

The compounds which are employed with the vinyl halides used according to the present invention are different from these vinyl halides which are gaseous at the reaction temperature and contain carbon, halogen, hydrogen or halogen and carbon atoms (i.e. perhalocarbons) and are characterized in the following specification as "halongenated organic compounds other than vinyl halides" for reasons of simplicity. These halogen organic compounds can be solid, fluid or gaseous at room temperature but they must be gaseous during the reaction of the vinyl halides with the hydrogen silanes at the temperature being used. If they contain aliphatic double bonds, at least two halogen atoms should be bonded to the two carbon atoms from which these double bonds proceed. The prefered halogen atoms in the halogenated organic compounds other than vinyl halides are chlorine, bromine and iodine. Because of the ready availability, chlorine is most preferred.

The halogenated organic compounds other than vinyl halides can contain one halogen atom or more per molecule, which can be alike or different and can be aliphatic, cycloaliphatic or aromatic. Preferred examples for the halogenated organic compounds other than vinyl halides are methylchloride, methylbromide, methyliodide, methylenechloride, chloroform, ethylbromide, 1,1,1- and 1,1,2-trichloroethane, perchloroethane, perchloroethylene, trichloroethylene, cyclopropylchloride, chlorobenzene, and the various bromophthalenes. Of these compounds, again trichloroethylene and methylene chloride are especially preferred because of their ready availability and because they give excellent results. The excellent results which are obtained by the use of trichloroethylene according to the present invention even at temperatures above 550° C. are especially surprising because it is known from U.S. Patent No. 2,770,634, that in the reaction of trichloroethylene with silanes, which contain silicon-bonded hydrogen atoms at temperatures above 550° C. a pyrolytic decomposition of the reaction mixture will take place, which will block the reaction tube within two hours.

Further examples of the organic halogen compounds which are different from the currently used vinyl halides are carbon tetrachloride, ethylchloride, 1,1- and 1,2- dichloroethane, 1,1,1,2- and 1,1,2,2-tetrachloroethane, pentachloroethane, hexachloroethane, 1,1- and 1,2-dichloroethylene, 1- and 2-chloropropane, 1,2-dichloropropane, isobutylchloride, 1,5-dichloropentane, benzylchloride and o-, m- and p-dichlorobenzene. Mixtures of the halogenated organic compounds other than vinyl halides can be used.

Preferably, the halogenated organic compounds other than vinyl halides being used are incorporated in quantities of 0.3 to 3 percent by weight, calculated on the weight of the vinyl halides.

The vinyl halides which can be used for the method of the present invention include all those vinyl halides which are suitable for reacting with silanes containing silicon-bonded hydrogen atoms at temperatures above 500° C. to form vinyl silanes. This includes especially vinyl chloride, which is also prefered because of its ready availability. Vinyl bromide, vinyl fluoride and vinyl iodide can can also be employed.

The silanes which contain silicon-bonded hydrogen atoms include all silanes for the method of the present invention which contain silicon-bonded hydrogen atoms, which are suitable for the reaction with vinyl halides at temperatures above 500° C. to form vinyl silanes. This includes especially silanes of the general formula $R_nSiHX_{3-n}$, wherein R is an alkyl radical with 1 to 5 carbon atoms, preferably methyl radicals or a phenyl radical, X is chlorine or bromine, preferably chlorine and $n$ is 0, 1 or 2. Examples of such silanes are those of the formula $HSiCl_3$, $CH_3SiHCl_2$, $(CH_3)_2SiHCl$, $(CH_3)(C_6H_5)SiHCl$ and $C_6H_5SiHCl_2$. The use of silanes containing a hydrocarbon radical between two silicon atoms, for instance, those of the formula

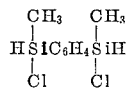

is not excluded. The use of low molecular weight hydrogensiloxanes (e.g. $\{(CH_3)_2HSi\}_2O$) which are gases at the reaction temperature is also contemplated but is not as significant as the use of silane reactants.

The method of the present invention can be carried out in the same apparatus, for example, a tube made of iron, quartz or ceramic filled with clay fillers, and at the same temperatures, particularly 550° to 650° C., pressures, preferably beneath 3 atm., especially normal pressure and with the same duration for heating the reaction components, especially 5 to 20 seconds, just as in previous methods for preparing vinyl silanes by reacting silanes containing silicon-bonded hydrogen atoms with vinyl halides at temperatures above 500° C. The upper limit on reaction temperature is determined by the pyrolytic decomposition of reactants and products.

The halogenated organic compounds other than the currently used vinyl halides can be added to the vinyl halides and/or the silanes containing silicon-bonded hydrogen atoms being used before introducing the reaction components into the reaction zone. This can take place, for example, by simply mixing the gaseous vinyl halide with a halogenated organic compound which is different from this vinyl halide, when the latter is gaseous at room temperature or if the latter is fluid or solid at room temperature, after vaporization or sublimation of this halogenated organic compound. However, it can also take place by conducting the gaseous vinyl halide or silane through an halogenated organic compound which is different from the vinyl halide, when this is fluid at the temperature which is current during this introduction, where upon the vinyl halides stream or the silane stream corresponding to the vapor pressure of the other halogenated organic compound is loaded with the latter. Mixtures of fluid vinyl halide and/or fluid silane and fluid halogenated organic compound can be vaporized together.

Finally, the halogenated organic compounds other than vinyl halides can be introduced partially or completely separately from the vinyl halides and the silanes into the reaction zone. The only decisive thing is that in the reaction zone all the gaseous materials incorporated within the framework of the present invention at temperatures above 500° C. should be distributed uniformly.

All the procedures described in the following examples are carried out at normal pressure. The examples are illustrative of the invention and do not define the scope of the invention which is set forth in the claims.

EXAMPLE 1

A mixture of 100 parts by weight of dimethylchlorosilane and two parts by weight of trichloroethylene (equal to 3 percent by weight based on the vinylchloride) was vaporized. The vapor mixture thus obtained was mixed with a gaseous vinyl chloride in equimolar amount of the dimethylchlorosilane and conducted through an iron tube from which the rust had been removed by sand blasting and which was 900 mm. long and 45 mm. in diameter with a throughput of 3 mols of dimethylchlorosilane and 3 mols of vinylchloride per hour. The tube was heated electrically to 590° C.

The vapor which came from the reaction tube was condensed and the yield of dimethylvinylchlorosilane was determined by gas chromatography. There was obtained a 60 percent yield of dimethylvinylchlorosilane based on the theoretical yield calculated on the reacted silane. After operating for 8 hours, the tube was examined for soot formation. It contained only a very small quantity of soot which had deposited at the walls in a very thin layer.

For comparison, the above procedure was repeated with the alteration that the trichloroethylene was not used. The yield was only 8 percent of the theoretical calculated on the reacted dimethylchlorosilane and after 4 hours, the test had to be discontinued because the tube was stopped up by soft, flocked deposits of soot.

EXAMPLE 2

A tube of heat stable scale-resistant chromium nickel steel having a length of 900 mm. and a diameter of 45 mm. was heated electrically to 560° C. Through the tube kept at this temperature, a vaporous mixture of 4 mols methyldichlorosilane, 4.5 mols vinylchloride and 0.05 mol of ethylbromide (1.8 percent by weight calculated on the weight of the vinylchloride) was conducted per hour.

The vapor which came from this reaction tube was condensed. The condensate obtained within 10 hours amounted to 4,830 g. and was fractionally distilled. The following silanes were obtained:

| | G. |
|---|---|
| Methyldichlorosilane | 2,100 |
| Methyltrichlorosilane | 180 |
| Methylvinyldichlorosilane | 1,680 |
| Residue | 650 |

After the 10 hours of operation, the tube was examined for soot formation. It contained only a very small quantity of soot which had deposited on the wall in a very thin layer.

EXAMPLE 3

The procedure described in Example 1 was repeated a number of times with the alteration that in place of the trichloroethylene, one of the following halogen carbon materials or halogen hydrocarbon materials was used in a quantity of 2 parts by weight (equal to 3 percent by weight based on the vinylchloride) per 100 parts by weight of dimethylchlorosilane. The following yields of dimethylvinylchlorosilane, calculated on reacted dimethylchlorosilane, were obtained:

Perchloroethylene—64% of the theoretical
Bromobenzene—48% of the theoretical
Chloroform—53% of the theoretical
Methyliodide—67% of the theoretical That which is claimed is:
1. The method of preparing vinyl silanes by reacting (1) silanes containing silicon-bonded hydrogen atoms with (2) vinyl halides at temperatures above 500° C. in the presence of (3) 0.05 to 10 percent by weight calculated on the weight of the vinyl halides of halogenated organic compounds which are (a) gaseous at the reaction temperature, (b) different from the vinyl halide employed, and (c) are composed of carbon and halogen atoms or carbon, hydrogen and halogen atoms.
2. The method according to claim 1 wherein the halogenated organic compounds (3) are employed in quantities of 0.3 to 3 percent by weight calculated on the weight of the vinyl halides.
3. The method according to claim 1 wherein the halogenated organic comopunds (3) are chlorinated organic compounds.
4. The method according to claim 1 wherein the halogenated organic compounds (3) being used are trichloroethylene or methylenechloride.
5. The method according to claim 2 wherein the halogenated organic compounds (3) are chlorinated organic compounds.
6. The method according to claim 2 wherein the halogenated organic compounds (3) being used are trichloroethylene or methylenechloride.
7. The method according to claim 3 wherein the halogenated organic compounds (3) being used are trichloroethylene or methylenechloride.

References Cited

UNITED STATES PATENTS 2,770,634  11/1956  Weyenberg ____ 260—448.2(E)

OTHER REFERENCES

Voorhoeve, "Organohalosilanes," Elsevier Publishing Co., N.Y. (1967), p. 42.

TOBIAS S. LEVOW, Primary Examiner

P. F. SHAVER, Assistant Examiner